G. W. PIPPEN.
ATTACHMENT FOR SAW GRINDERS.
APPLICATION FILED MAY 20, 1908.
922,504.
Patented May 25, 1909.
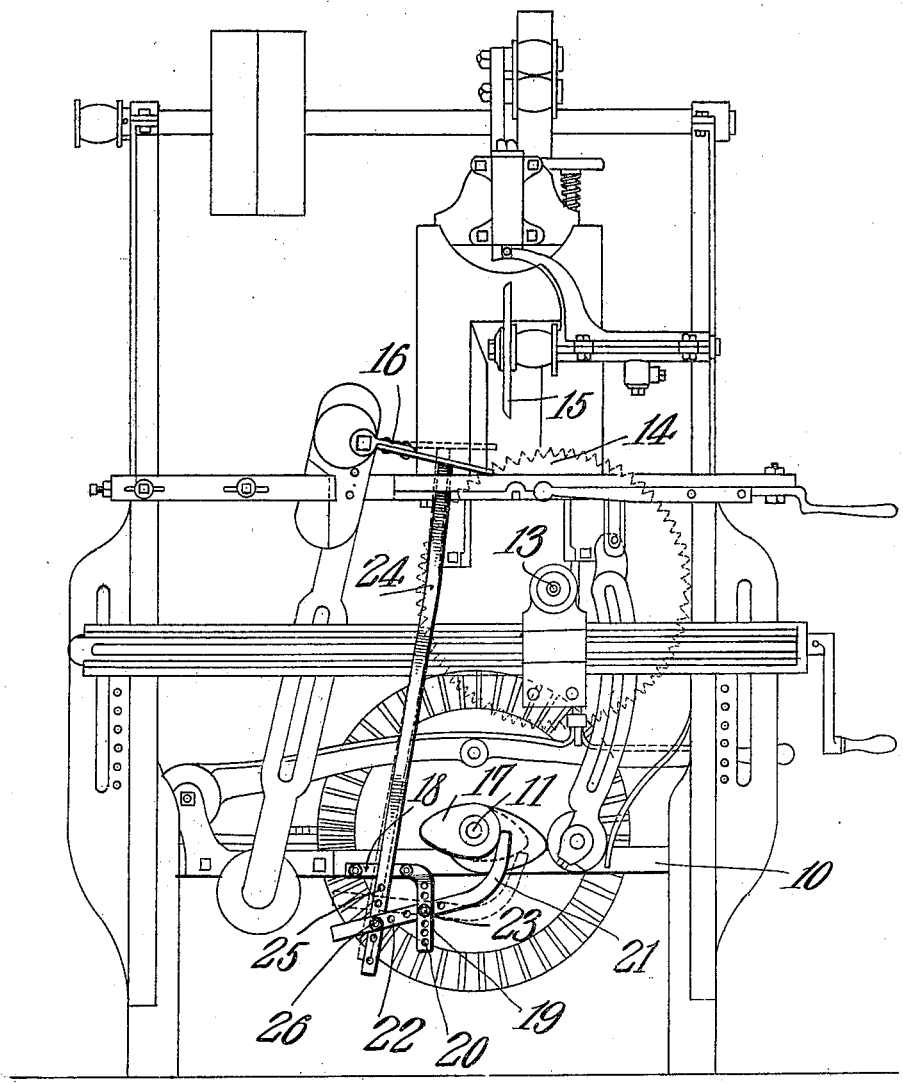
Witnesses
Inventor
George W. Pippen.
By C. A. Snow & Co.
Attorneys

UNITED STATES PATENT OFFICE.

GEORGE W. PIPPEN, OF CRAVENS, LOUISIANA.

ATTACHMENT FOR SAW-GRINDERS.

No. 922,504.  Specification of Letters Patent.  Patented May 25, 1909.

Application filed May 20, 1908. Serial No. 433,975.

*To all whom it may concern:*

Be it known that I, GEORGE W. PIPPEN, a citizen of the United States, residing at Cravens, in the parish of Vernon and State of Louisiana, have invented a new and useful Attachment for Saw-Grinders, of which the following is a specification.

This invention relates to saw grinding machines and has a special reference to an attachment for such machines designed to lift the feed pawl during one portion of the stroke of the same.

One object of the invention is to provide a saw grinder with mechanism whereby the feed pawl, used to advance the saw, shall be lifted free of the saw teeth during retraction.

A further object of the invention is to provide an attachment for the purpose mentioned which may be readily applied to any existing saw grinder.

With these and other objects in view as will hereinafter become apparent, the invention consists of an attachment comprising a cam adapted to be secured to one of the rotating shafts of the saw grinder, a lever having a fulcrum adapted to be secured to the frame of a saw grinder, and a lift rod having an end adapted to engage the feed pawl of the saw grinder and pivotally attached at said lever at the opposite end, the lever and lifting bar being adjustable for effective length so that the device may be applied to any machine.

The invention further consists in certain novel arrangements of details and combinations of parts, hereinafter fully described, illustrated in the accompanying drawings, and specifically set forth in the claims.

In the accompanying drawings, the figure represents the front elevation of a saw grinder with the improved mechanism attached thereto, the saw grinder shown in the light lines and the attachment in heavy lines.

In the form of saw grinder herewith shown, the numeral 10 indicates the frame of the machine. At 11 is shown one of the rotating shafts of the machine, in this case the main or cam shaft. A saw arbor 13 is shown mounted on the machine and a circular saw 14 in position thereon for grinding. It is obvious that the saw arbor may be replaced by a device for holding a band saw or other type of saw, but as the action will be substantially the same in all cases this circular saw and arbor have here been shown. In the usual form of these grinders there is an emery or other abrasive wheel 15 mounted on a suitable spindle and driven by power at a high rate of speed. A feed pawl 16 is held to coact with the teeth of the saw 14 and is so connected to the mechanism that it is arranged to advance the saw one tooth on each stroke thereof. This feed pawl 16 is actuated generally from the cam shaft and is connected thereto by a suitable system of levers and rods.

The attachment embodied in the present invention comprises a cam 17 arranged to be attached to and rotate with one of the shafts as the shaft 11. A bracket 18 provided with a downwardly extending arm 19 is arranged for attachment to a stationary portion of the frame 10. A downwardly extending arm 19 of this bracket is provided with a plurality of holes 20. A lever 21 is held, to contact with the cam 17, on the bracket 18. This lever 21 is provided with a plurality of holes 22, and a bolt 23 is arranged to pass through one of the holes in said lever and one of the holes in the downwardly extending arm 19 of the bracket 18. The bolt 23 thus forms the fulcrum for the lever 21. It is obvious that by changing the position of the bolt 23 the arms of the lever 21 may be varied at will and further that the position of the lever 21 with reference to the cam 17 may also be changed. A lifting bar 24 extends upward through a suitable hole bored in the table of the grinder, and contacts with the under side of the pawl 16. The lifting bar 24 is provided at its lower end with a plurality of holes 25. A bolt 26 passes through one of the holes 25 and one of the holes 22 of the lever 21 and thus forms a pivotal point between the lifting bar 24 and the lever 21. This also affords a means of adjustment whereby the amount of lift and length may be varied to suit the requirements of the particular case in which it is to be used.

In the operation of the device, the cam 17 is so positioned on the shaft 11, and the lever 21 so adjusted on the bracket 18 that the lifting bar 24 will raise the feed pawl 16 precisely at the time when the movement of withdrawal or retraction of that pawl begins. The amount of lift which may be desired is arranged for by shifting the bolt 26 to one or the other of the holes 22, and the effective length of the lifting bar is arranged for by shifting that bolt to some one of the holes 25 which is best adapted for the purpose.

The utility of the device will be well understood when it is considered that the teeth against which the feed pawl rests are very often badly burred and bent and that the feed pawl frequently catches on those teeth during the movement of retraction with the consequence that the abrasive wheel 15 is broken or the teeth are badly ground. By means of the lifting of the feed pawl 16 at the precise time at which it is effected, it will be impossible for the same to catch on the bent or damaged points of the teeth and thus no damage will result to the saw or abrasive wheels. There is thus provided a simple and efficient device of the character described and for the purpose specified.

Having thus described the invention what is claimed is:—

1. In a saw grinding or sharpening machine, a feed pawl arranged to engage with and advance the teeth of the saw, means for actuating the pawl, and means for automatically raising the pawl from engagement with the tooth to prevent contact between the pawl and the saw during the return movement of said pawl.

2. In a saw grinder, an oscillating feed pawl arranged to coact with the teeth of a saw and advance the same during the forward movement of said pawl, and automatic means for positively freeing said pawl from the teeth during each retraction.

3. In a saw grinder, an oscillating feed pawl arranged to coact with the teeth of a saw and advance the same during the forward movement of said pawl, a lifting bar arranged to raise said pawl during retraction, and automatic means on the grinder to actuate said lifting bar in timed relation to the movement of said pawl.

4. In a saw grinder, an oscillating feed pawl arranged to coact with the teeth of a saw and advance the same during the forward movement of said pawl, a lifting bar engaging said pawl, a cam rotated by the mechanism of said grinder, and a lever pivoted to said grinder and engaging said lifting bar and cam to lift said pawl from contact with said teeth during each retraction.

5. An attachment for saw grinding machines comprising a feed pawl designed to coact with the teeth of a saw to feed the same, a cam arranged to be attached to and rotate with one of the shafts of said saw grinding machine, a bracket adapted to be attached to the frame of the saw grinder, a cam lever adjustably fulcrumed on said bracket, and a lifting bar pivotally and adjustably attached to said cam lever to actuate said pawl and lift the same during each retraction.

In testimony that I claim the foregoing as my own, I have hereto affixed my signature in the presence of two witnesses.

GEO. W. PIPPEN.

Witnesses:
  J. A. SMITH,
  B. E. PILLOW.